United States Patent
Chase

(10) Patent No.: US 7,797,339 B2
(45) Date of Patent: *Sep. 14, 2010

(54) SECURITY ARCHITECTURE FOR CONTENT MANAGEMENT SYSTEMS

(75) Inventor: Michael Chase, Madison Heights, MI (US)

(73) Assignee: Autodesk, Inc., San Rafael, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 11/420,657

(22) Filed: May 26, 2006

(65) Prior Publication Data

US 2007/0276834 A1 Nov. 29, 2007

(51) Int. Cl.
*G06F 7/00* (2006.01)
*G06F 17/30* (2006.01)

(52) U.S. Cl. ........................... 707/781; 707/785

(58) Field of Classification Search ............... 715/219
See application file for complete search history.

(56) References Cited

U.S. PATENT DOCUMENTS

| | | | |
|---|---|---|---|
| 5,826,268 A * | 10/1998 | Schaefer et al. ............. 707/9 |
| 7,123,974 B1 * | 10/2006 | Hamilton ................. 700/87 |
| 2002/0099952 A1 * | 7/2002 | Lambert et al. ............. 713/200 |
| 2003/0084331 A1 * | 5/2003 | Dixon et al. ............... 713/200 |
| 2004/0225968 A1 * | 11/2004 | Look et al. ............... 715/778 |
| 2005/0097441 A1 * | 5/2005 | Herbach et al. .......... 715/501.1 |
| 2007/0174281 A1 * | 7/2007 | Chase ..................... 707/9 |

* cited by examiner

*Primary Examiner*—Apu M Mofiz
*Assistant Examiner*—Susan Y Chen
(74) *Attorney, Agent, or Firm*—Patterson & Sheridan, LLP

(57) ABSTRACT

Embodiments of the invention provide methods, apparatus, and articles of manufacture for providing security architecture for content management systems. An audit log table separates security concerns in framework code from application concerns in application code. Application developers place database access code in stored procedures. Each stored procedure records a unique identifier for each object involved in the database access code into an audit log, for later security checking by framework code. After executing the stored procedure, the framework code determines whether the stored procedure was authorized by checking the audit log and access control lists stored in the database. If not, an access violation error may be returned and the database may be rolled back.

11 Claims, 3 Drawing Sheets

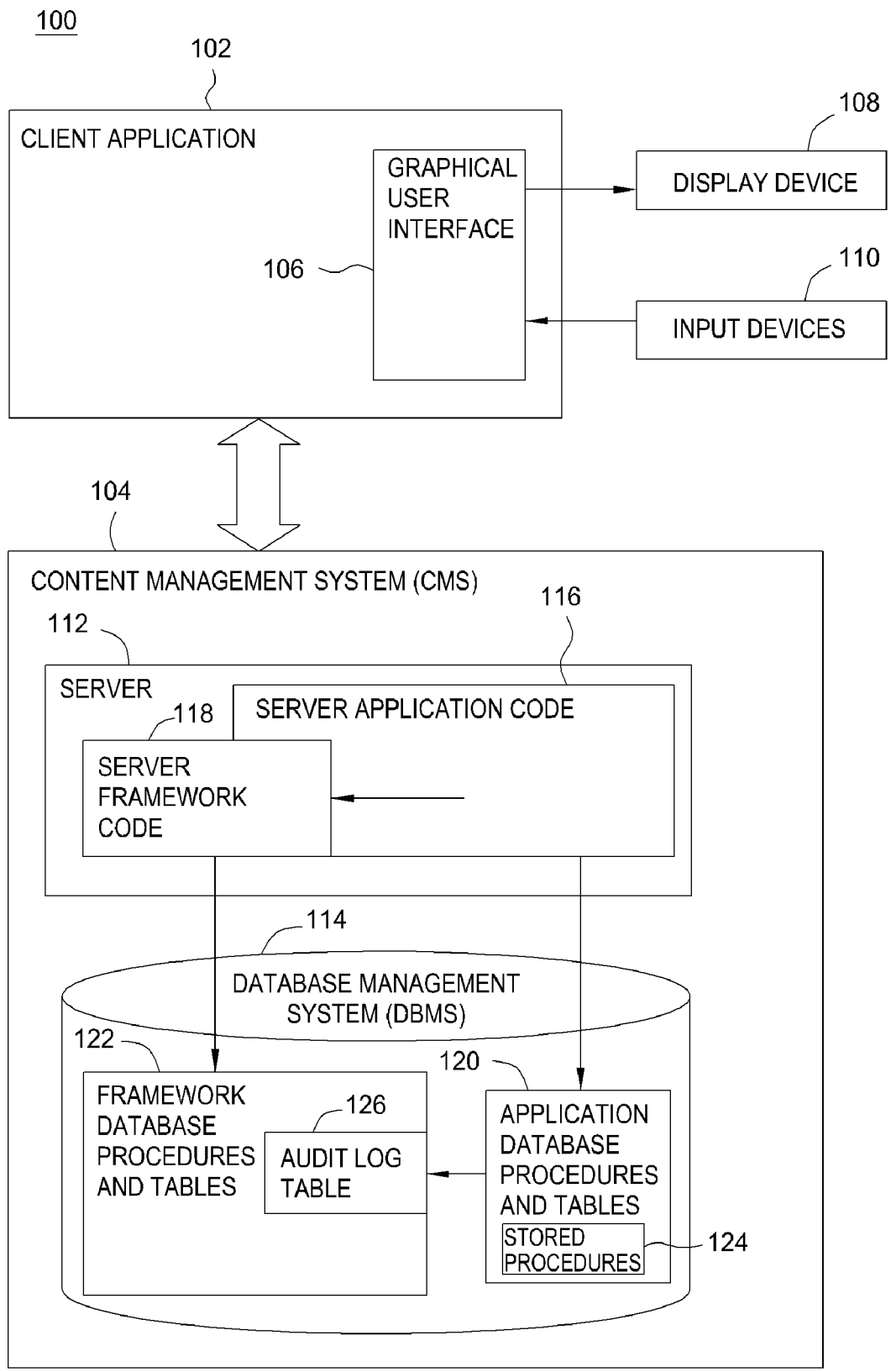

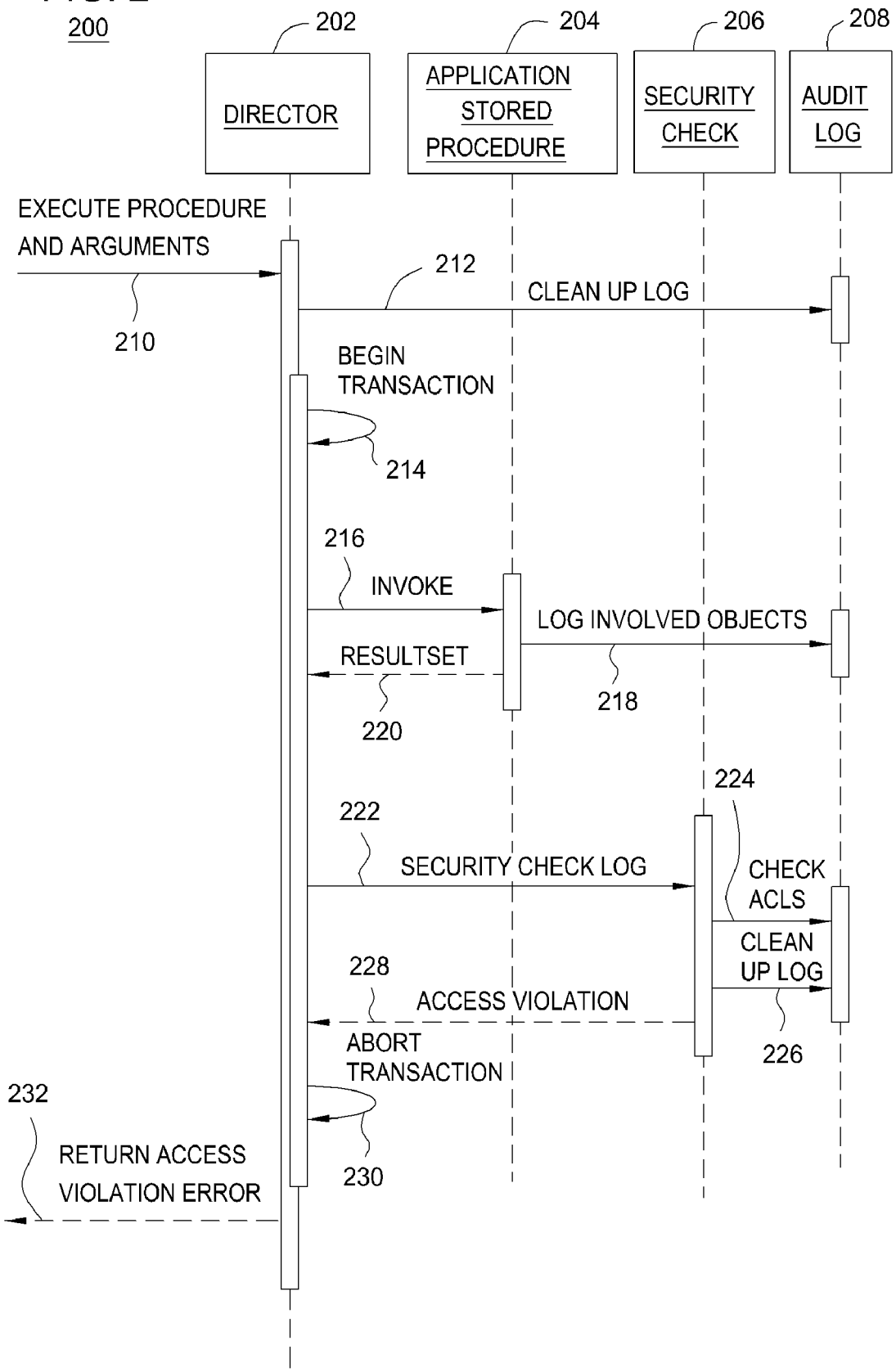

SECURITY ARCHITECTURE FOR CONTENT MANAGEMENT SYSTEMS

BACKGROUND OF THE INVENTION

1. Field of the Invention

The present invention generally relates to computer security, database management systems (DBMS), and content management systems (CMS). More specifically, the present invention relates to a method of enforcing access rules for objects stored in a CMS that are accessed by a variety of application programs.

2. Description of the Related Art

Generally, CMS systems are used to provide a single, secure repository for virtually any kind of digital information (e.g., files, documents, objects, tables, and other data). For example, a CMS system may be used to store design data, files, and drawings, etc., accessed by multiple users of a computer-aided design (CAD) system. By storing content in a centralized location, users can locate, share, reference, and reuse that content. A CMS is a computer software system for organizing and facilitating collaborative creation of content in a multi-user system. Typically, a CMS stores user content in a file system and stores information about the files in a relational database. Because a CMS system may provide broad accessibility to multiple users, it is often desirable to restrict which content users may access. For example, access restrictions may be specified using access control lists (ACLs).

An ACL is used to enforce access rules for an object identified in the ACL. ACLs are a means of determining whether a user has the appropriate access rights to a given object depending on attributes of the user making the request, (e.g., the user's identity or membership in a group). An ACL is a data structure (e.g., a table) with entries specifying individual user or group rights to specific system objects, such as a program, a process, or a file. The privileges or permissions determine specific access rights, such as whether a user can read from, write to, or execute an object. Thus, among other things, an entry in the ACL controls whether a user, or group of users, may alter or access an object, or both.

To provide adequate security in a CMS, ACLs may need to be associated with individual rows in one or more tables in the relational database. This occurs because the CMS system may use individual rows of a database table to reference objects in the file system, each with an entry in an ACL. Existing DBMS systems fail to provide support for this kind of access control. As a result, one approach to provide the necessary security is to have a user application to perform access checks when performing an operation involving content in the CMS system. However, access control and the core application functionality (e.g., providing a CAD system) are usually unrelated concerns. A well-designed application should reflect a separation of these concerns by coding access controls independently from application functionality.

Two common approaches used to provide access control in a CMS system suffer from several drawbacks. As suggested, in a first approach, an application programmer may explicitly code access checks as part of an application that accesses content in the CMS. For example, an application may include structured query language (SQL) queries or stored procedures that perform access control functions for content stored in the CMS. A stored procedure is a set of SQL statements with an assigned name that is stored in the database in compiled form. This first approach violates the desired separation of concerns principle, because it entangles access control with application logic. Worse, the rather low level of sophistication available in the SQL language results in duplicated code strewn throughout every query or stored procedure because the routines that perform the access checks are duplicated in each function that accesses the database.

A second approach includes providing a data access framework using a load-modify-store architecture that treats the database as dumb storage. While this second approach allows the use of higher-level languages and object-oriented techniques to separate application program concerns from security and access control, it has performance problems due to large amounts of small data interactions with the database. Thus, this approach does not scale well.

Accordingly, there is a need for a method to allow access checks to run in the database and, at the same time, keep the access checking code separate from the application code. There is also a need for a time and cost efficient solution.

SUMMARY OF THE INVENTION

Embodiments of the invention include a method, an apparatus, and an article of manufacture used to provide security and access control features for content stored by a content management system.

One embodiment is a method for providing security architecture for content management systems. The method generally includes, invoking an application stored procedure, which records an identifier in an audit log for each of a plurality of objects involved in a database operation performed by the stored procedure, invoking a security check procedure configured to perform an access control check to determine whether the application stored procedure was authorized to perform the database operation, using the identifiers recorded into the audit log, and returning any access violation error. In the event of an access violation error, the method may further include, reverting a database back to an operational state that existed prior to performing the database operation of the stored procedure.

Another embodiment of the invention a computer-readable medium containing a program which when executed by a processor, performs the method for providing security architecture for content management systems.

Still another embodiment is a system for providing security architecture for content management systems, including an application stored procedure, a security check procedure, and a director. The application stored procedure includes one or more database access operations and code to insert an identifier for each object involved in the database access operations into an audit log. The security check procedure performs a security check on the audit log by checking ACL tables to determine whether the application stored procedure was authorized. The director invokes the application stored procedure, calls the security check procedure, and returns any access violation error.

Advantageously, a developer writing the business logic of a client application need not repeatedly embed security-checking instructions into application code. Checking for proper access is the concern of the system and the responsibility of the framework and infrastructure, freeing the application developer to concentrate on implementing application features.

BRIEF DESCRIPTION OF THE DRAWINGS

FIG. 1 is a block diagram illustrating an exemplary system environment for practicing an embodiment of the invention;

FIG. 2 is a diagram illustrating an exemplary operational flow for executing a stored procedure and performing a security check, according to one embodiment of the invention;

DETAILED DESCRIPTION OF THE PREFERRED EMBODIMENTS

Figure 3A:
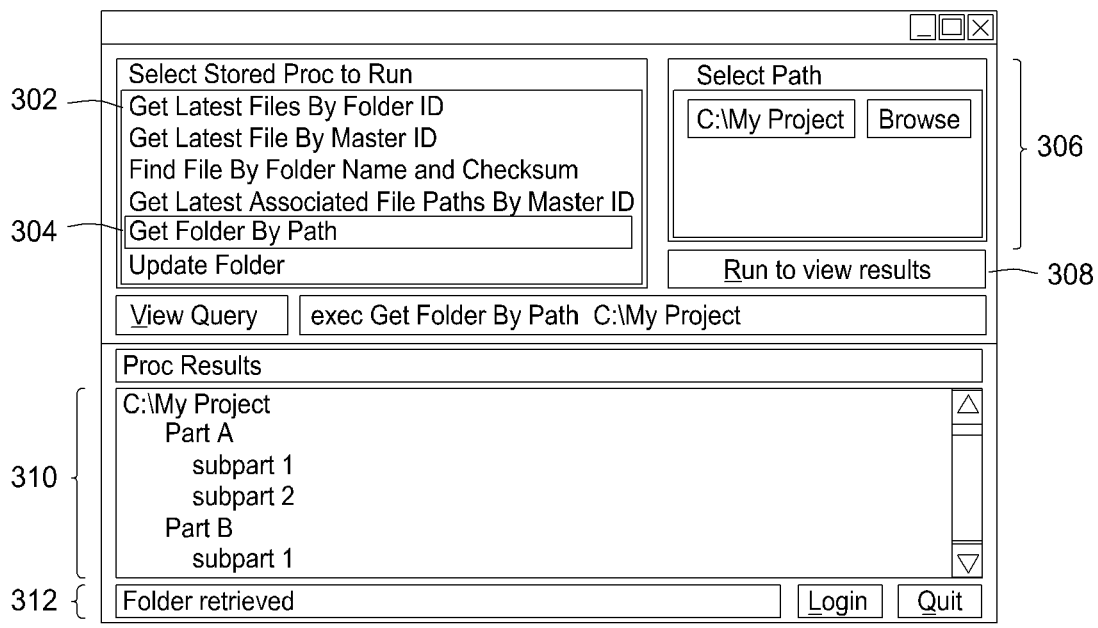
FIG. 3A is an illustration of a successful execution of a stored procedure, according to one embodiment of the invention.

Embodiments of the invention provide a method, an apparatus, and an article of manufacture for enforcing access control restrictions specified for content stored by a content management system (CMS). Thus, embodiments of the invention provide security in a CMS for applications that access data, files, or objects stored by the CMS, such as a computer-aided design (CAD) application. However, embodiments of the invention are not limited to CAD applications or CAD environments; rather, embodiments of the invention may be adapted to provide security and data access controls for any application that stores any kind of content in a CMS.

One embodiment solves the problem by separating a security layer from an application layer using a minimal "hook-point" where the two layers interact. The "hook-point" may be an audit log table stored in the database. The audit log table includes unique database identifiers (IDs) that identify records in the database (e.g., a file or a version of a file in a CAD system) and user sessions, among other information. In practice, when an application requests a transaction that should be vetted for security and access control concerns, the application records the IDs of any objects involved in the transaction in the audit log table. The system then retrieves the IDs from the table to perform a security check. In this manner, the audit log efficiently decouples security and application concerns, allowing application developers to write application code without being overly concerned with security.

In this embodiment, stored procedures provided by the application developer add information to the audit log. An application developer places database access code in stored procedures, which are stored in the database for later execution. The developer may create these stored procedures using a library of development tools and an application programming interface (API). The library and API are provided to developers (e.g., third party developers or application programmers to developers as part of a given CMS system), allowing them to create customizations or extensions to the application (e.g., to a CAD system) in the form of application code. One kind of application code is a stored procedure. Stored procedures may read data, modify data, create new data or perform other operations, such as checkout files, copy files, delete files, etc. When the application performs an operation that involves information, data, or files managed by the CMS system, the stored procedure writes all the relevant IDs for each object involved in the operation into the audit log (i.e., all the IDs of things referenced, accessed, or touched in some way by the stored procedure) for later security checks. The application developer does not need to have an application perform security related operations, and therefore, is not involved in access control checks (beyond placing IDs in the audit log).

In one embodiment, the system is logically (but not necessarily physically) represented by a layered model with interaction between the layers. A client application layer interacts with a server application layer. The server application layer, in turn, interacts with both a database application layer and a server framework layer. The client application layer includes application code and the server framework layer includes framework code. To invoke a stored procedure, the client application layer passes a request to the server application layer, which passes the request to the server framework layer. In turn, the server framework layer may invoke the stored procedure, perform the appropriate access control checks, and return any results back through the layered framework.

FIG. 1 illustrates an exemplary system environment 100 for practicing this embodiment of the invention. The system 100 may be any kind of system having a CMS, including a CAD system. In the system 100, a client application 102 interacts with a content management system (CMS) 104 to read data, modify data, create new data or perform other operations, such as checkout files, copy files, delete files, etc, or perform any other functions provided by client application 102 using content from CMS 10. In one embodiment the Autodesk Vault content management system available from Autodesk, Inc., may be used.

The components illustrated in FIG. 1 include computer software applications configured for existing computer systems, e.g., desktop computers, server computers, laptop computers, tablet computers, and the like. The applications described herein, however, are not limited to any particular computing system and may be adapted to take advantage of new computing systems as they become available.

Additionally, the components illustrated in system 100 may be software applications executing on distributed systems communicating over computer networks including local area networks or large, wide area networks, such as the Internet. For example, a graphical user interface 106 and client application 102 may include software programs executing on a client computer system communicating with CMS system 104 over a computer network (e.g., an office LAN, a corporate intranet, or the Internet). Also, the components illustrated in FIG. 1 may be provided as an application program (or programs) stored on computer readable media such as a CD-ROM, DVD-ROM, flash memory module, or other tangible storage media.

Figure 3B:
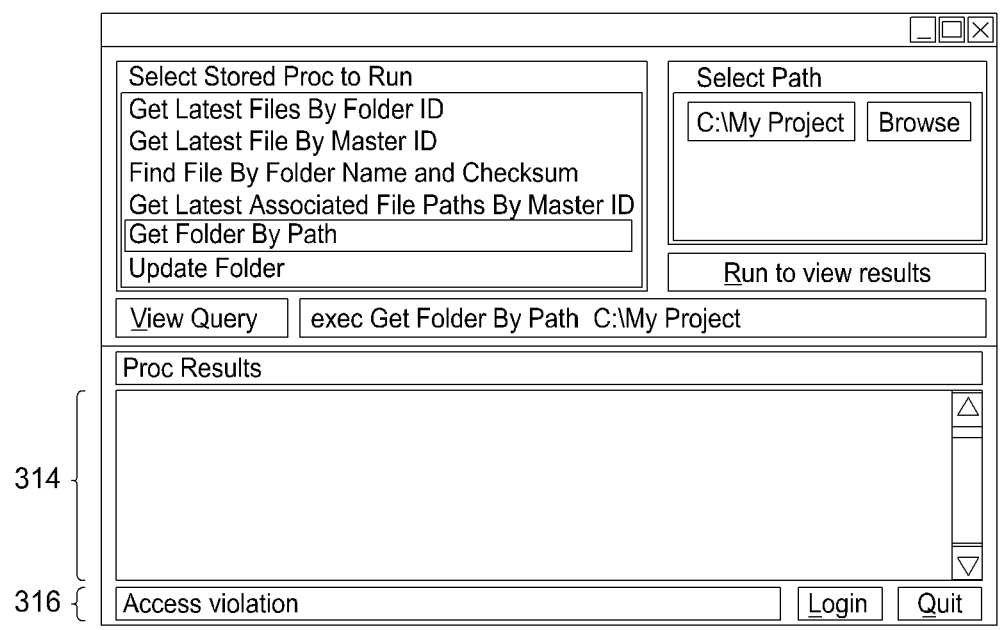
FIG. 3B is an illustration of an attempt to execute the stored procedure of FIG. 3A, resulting in an access violation, according to one embodiment of the invention.

As shown, the client application 102 includes a graphical user interface (GUI) 106, a display device 108, and input devices 110. For example, in a CAD system, the GUI 106 may display design drawings on the display device 108 and provide functionality for creating, modifying, sharing, and maintaining the design drawings, which is accessible by using the input devices 110. In such a case, CMS 104 manages content for the CAD system 104. Typically, input devices 108 include a mouse pointing device and a keyboard, and display device 108 is a CRT monitor or LCD display. An example of a user interacting with client application 102 to access content stored by the CMS system 104 is shown in FIGS. 3A and 3B.

In one embodiment, CMS system 104 includes a server 112 and a database management system (DBMS) 114. Server 112 provides services to the client application 102 (e.g., file check-in, checkout) and DBMS 114 manages data for the application (e.g., storing design drawings for the CAD system and storing stored procedures). Within the CMS 104, both the server 112 and the DBMS 114 include some application code 116, 120 and some framework code 118, 122. Application code 116, 120 provides the functionality of the client application 102 (e.g., CAD system), and framework code 118, 122 provides the functionality of the CMS 104 (e.g., securely managing content for the CAD system).

As shown, server 112 includes server application code 116 and server framework code 118. When a user interacting with client application 102 requests an operation, for example, to checkout a design drawing stored by CMS 104, client application 102 sends a request to server framework code 118, requesting to check-out objects from CMS 104 that are associated with the design drawing. After completing the check-out operation (including performing the appropriate access control checks), server framework code 118 provides the requested objects to the client application 102 so that the GUI 106 may display the design drawing on display device 108.

The DBMS 114 may include separate database procedures and tables for the application code 120 and the framework code 122. The application database procedures and tables 120 include stored procedures 124 used to perform application related functions. The framework database procedures and tables 122 include audit log table 126 used as the "hook-point" between client application 102 and CMS 104. When the CMS 104 invokes a stored procedure 124, e.g., to check-out a design drawing, that stored procedure 124 records the IDs associated with the design drawing being checked out into the audit log table 126. Then, a security check procedure in framework database procedures and tables 122 performs a security check using these IDs to ensure that client application 102 has the appropriate access privileges to checkout the requested design drawing.

More generally, when a client application 102 performs a transaction involving objects stored by CMS 104, the server application code 116 invokes a stored procedure 124, which may be configured to record the IDs of the objects in audit log table 126. Doing so effectively "passes" IDs for the objects to the database procedures 122, allowing the database procedures 122 to perform an access control check on each object involved in the transaction. The application code 116, 120 requests the framework code 118, 122 to invoke one of the stored procedures 124. After executing the stored procedure 124, the framework code 118, 122 executes a security check procedure to perform an access control check on the IDs inserted in the audit log table 126 by the stored procedure 124. The access control check determines whether the transaction performed by the stored procedure 124 may take place.

If the system determines that an access violation has occurred, the framework code 118, 122 may respond in a variety of ways. For example, if the system 100 denies permission to modify data, the system 100 may reverse a transaction performed by the stored procedure 124 using standard SQL mechanisms, allowing the system 100 to be rolled back to the state that existed prior to the transaction. In some cases, it may be preferable to execute stored procedure 124, check the security, and perform a rollback, if necessary, as opposed to checking the security before executing the stored procedure. For example, it may be inefficient to perform a security check for each step of a multi-step transaction. Further, by performing the security check after performing stored procedure 124, system 100 shields client application 102 from the details of security and instead system 100 only informs client application 102 when there is an access violation. Similarly, the framework code 118, 122 does not need to know the details of the transactions or operations performed by the stored procedure or the operations of client application 102. Instead, framework code 118, 122 only needs to evaluate the IDs in audit log 126 for the objects involved in a particular transaction. In this way, the system 100 decouples security concerns from application concerns.

Although assigning responsibility to the client application for adding IDs to the audit log table 126 represents a minor entanglement of access checking and application concerns, this minor entanglement allows the framework code 118, 122 to access check the audit log table 126. The details of how to represent and store ACLs and how and when to check them are only the concern of the framework code 118, 122, and they are not any concern of the application code 116, 120. Thus, access checking does not become part of the application code 116, 120. This allows developers to build applications more quickly, because they do not need to embed security-aware code within their business logic. Separation of concerns also simplifies software maintenance, because the security code is centralized and not duplicated in many pieces of code. Further, the system 100 minimizes the amount of data that moves into or out of the database by storing access controlled data, ACLs, and access-checking code in the DBMS 114. Moreover, the audit log 126 provides a useful "hook-point" for passing information between client application 102 and CMS 102 related to many system functions in addition to enforcing access control rules, none of which need be the application developer's concern.

FIG. 2 illustrates an exemplary operational flow 200 for executing a stored procedure and performing a security check, according to one embodiment of the invention. Persons skilled in the art will understand that any system configured to perform operational flow 200 shown in FIG. 2, in any order, is within the scope of the present invention.

In this example, the following components interact to execute an application stored 204 procedure and to perform the security check: a director 202, application stored procedure 204, a security check procedure 206, and an audit log 208. In one embodiment, director 202 is part of framework code 118, 122 illustrated in FIG. 1. Application stored procedure 204 is part of application code 116, 120 and stored in database 114. Security check procedure 206 is part of framework code 118, 122 and also stored in database 114. Audit log 208 is part of the framework code 118, 122, but is accessible to the application code 116, 120.

Director 202 is part of a known director/builder software design pattern. This pattern is a computer software concept for separating the construction of a complex object (or set of objects) from the representation of the object so that the same construction process can create different representations. Other embodiments may use other patterns or constructs. In one embodiment, director 202 is part of framework code 118, 122 and the builder (not shown) is part of application code 116, 120. As understood by persons skilled in the art, the director/builder pattern defines the following concepts: builder, product, director 202, and concrete-builder. The builder is an abstract interface for creating parts of an object (the product); the product represents the complex object under construction; director 202 constructs the object using the builder interface; and the concrete-builder constructs and assembles parts of the product by implementing the builder interface.

Data access routines in stored procedures return one or more sets of differing types of objects. The builder builds each object from one of the result sets returned from a stored procedure. Obtaining and processing results sets, checking access control, and building objects is generally the responsibility of director 202. Thus, director 202 directs both the construction of the results, as well as the process of obtaining result sets. In one embodiment, when a developer codes a data access routine, the developer instantiates director 202 and supplies it with the parameters of the stored procedure, instantiates one or more builders and adds them to director 202, and then executes director 202. When a transaction may include multiple result sets, the developer adds a builder (or an array of builders) to the director 202, with one builder object responsible for processing one of the result sets.

As stated above, audit log 208 provides a "hook point" for separating security and application concerns. Each stored procedure 204 records IDs for each of the objects affected by its operations (including any resulting objects) in audit log 208. Stored procedure 204 may record object IDs into the audit log 209 with a session ID (or thread ID). The session ID allows the system to distinguish between different transactions. The session ID may be based on the identity of the user or process recording object IDs into audit log 208. In one embodiment, the system 100 may add other attributes to audit log 208. In one embodiment, the entire audit log is access checked at once, relative to a given transaction. More generally, one skilled in the art will typically implement the system 100 and audit log 208 in such a way as to minimize performance overhead.

As shown in FIG. 2, at step 210 director 202 receives a request to invoking application stored procedure 204 along with any required arguments for the stored procedure 204. For example, client application 102 may request the director 202 to invoke a procedure to check out objects managed by CMS 104. At step 212, director 202 cleans-up audit log 208 by removing any information from prior executions of application stored procedure 204. As shown, the director 202 cleans up at audit log 208 at the beginning of operational flow 200. Alternatively, however, the director 202 may clean up audit log 208 when a transaction is completed.

At step 214, director 202 begins performing the requested transaction, and at step 216, invokes application stored procedure 204. At step 218, application stored procedure 214 records the objects ID for objects involved in the transaction in audit log 208. At step 220, the application stored procedure 204 returns the results of stored procedure 204 to director 202.

At step 222, director 202 invokes security check procedure 106 to perform an access control check using the object IDs in audit log 208. In one embodiment, security check procedure 106 performs the security check by using an ACL. In this embodiment, database tables may be used to represent access control lists (ACLs). The security check procedure 106 checks the role-based permissions on users and the ACLs on objects involved in the transaction being evaluated. Security check procedure 206 may evaluate permissions for a set of objects at once, instead of individually. Doing so may avoid loading objects into memory and then going back to load permissions. Another embodiment avoids loading ACLs with objects. Those skilled in the art will recognize that other embodiments may implement ACLs in other ways. At step 226, audit log 208 is cleaned-up by security check procedure 206. At step 228, if an access violation has occurred, security check procedure 206 notifies the director 202. In response, director 202 may abort the transaction at step 230 and return the access violation error to the application code 116 at step 232. The application code 116 may handle the access violation in any appropriate manner. For example, application code 116 may be configured to notify a user that a requested transaction has filed due to a lack of sufficient access rights or privileges.

FIG. 3A illustrates a successful execution of a stored procedure, according to one embodiment of the invention. FIG. 3A shows an exemplary GUI 300 for executing a stored procedure. Other embodiments may use other interfaces or no interface at all. In this illustration, the user may select a stored procedure to run from a list 302. Here, the user has selected the stored procedure called "Get Folder By Path" 304, which is highlighted. This stored procedure takes a directory path as a parameter, which the user enters in the upper right part 306 of the GUI. Here, the user has entered "C:\My Project" as the directory path and, then, selected the "Run to view results" button 308. The results are displayed 310 with the status "Folder retrieved" 312, indicating successful execution of the stored procedure.

FIG. 3B illustrates an attempt to execute the stored procedure of FIG. 3A, resulting in an access violation, according to one embodiment of the invention. FIG. 3B illustrates the result for the attempting to execute same stored procedure when there is an access violation. In this case, there are no results displayed 314 and the status "Access violation" 316 is displayed, indicating unsuccessful execution of the stored procedure. Of course, other embodiments may display results and statuses in different ways and FIGS. 3A and 3B only illustrate one possible way.

The disclosed exemplary embodiments of the invention include methods, apparatus, and an article of manufacture for providing security architecture for content management systems. In one embodiment, a security framework applies access control to folders and their contents in a file management system in a database. Various embodiments provide access control at different levels of granularity, such as to individual objects in a database. Some embodiments provide flexibility to allow many different access control models. The embodiments make security checks the responsibility of the framework layer so that it is transparent to application layer. Embodiments include an audit log that reduces the performance impact of object-level access checks. Embodiments separate security concerns from application concerns (e.g., business logic) by minimizing the overlap or visibility of the security system. Advantageously, a developer writing business logic need not repeatedly embed security-checking instructions into application code. Checking for proper access is the concern of the system and the responsibility of the framework and infrastructure, freeing the application developer to concentrate on implementing application features.

While the foregoing is directed to embodiments of the present invention, other and further embodiments of the invention may be devised without departing from the basic scope thereof, and the scope thereof is determined by the claims that follow.

I claim:

1. A computer-implemented method for providing security architecture for a content management system, comprising:
   receiving a request from a client application to execute an application stored procedure stored in a database management system, wherein the application stored procedure includes a database transaction involving a data object stored in a database within the database management system and is configured to create a record specifying an identifier associated with the data object in an audit log, and wherein the audit log stores a different record for each object involved in one or more database transactions included in the application stored procedure;
   invoking the application stored procedure;
   invoking a security check procedure that is configured to perform an access control check based on the identifier specified in the record included in the audit log to determine whether the client application is authorized to access the data object;
   cleaning the audit log by removing each of the different records for each object involved in the one or more database transactions included in the application stored procedure;
   returning an access violation error to the client application when the client application is not authorized to access the data object; and displaying the access violation error on a graphical user interface (GUI), wherein the GUI comprises options in a single screen to: select a stored procedure to run, select a path to load additional stored procedures, and run a stored procedure to review the executed results.

2. The method of claim 1, wherein the audit log, the security check procedure, and ACL tables are part of framework code stored in the database management system, further wherein the audit log is visible to application code.

3. The method of claim 1, wherein the security check procedure determines whether the client application is authorized to perform the database operation by comparing the identifiers in the audit log with entries in an access control list (ACL) specifies access control rules for the data object.

4. The method of claim 1, wherein the content management system stores computer aided design (CAD) content for users of a CAD application.

5. The method of claim 1, further comprising, in response to an access violation error, reverting the database back to an operational state that existed prior to executing the database transaction.

6. A computer-readable medium containing a program which when executed by a processor, performs a method for providing security architecture for content management systems, the method comprising:
   receiving a request from a client application to execute an application stored procedure stored in a database management system, wherein the application stored procedure includes a database transaction involving a data object stored in a database within the database management system and is configured to create a record specifying an identifier associated with the data object in an audit log, and wherein the audit log stores a different record for each object involved in one or more database transactions included in the application stored procedure;
   invoking the application stored procedure;
   invoking a security check procedure that is configured to perform an access control check based on the identifier specified in the record included in the audit log to determine whether the client application is authorized to access the data object;
   cleaning the audit log by removing each of the different records for each object involved in the one or more database transactions included in the application stored procedure; and
   returning an access violation error to the client application when the client application is not authorized to access the data object; and
   displaying the access violation error on a graphical user interface (GUI), wherein the GUI comprises options in a single screen to: select a stored procedure to run, select a path to load additional stored procedures, and run a stored procedure to review the executed results.

7. The computer-readable medium of claim 6, wherein the audit log, the security check procedure, and ACL tables are part of framework code stored in the database management system, further wherein the audit log is visible to application code.

8. The computer-readable medium of claim 6, wherein the security check procedure determines whether the client application is authorized to perform the database operation by comparing the identifiers in the audit log with entries in an access control list (ACL) specifies access control rules for the data object.

9. The computer-readable medium of claim 6, wherein the content management system stores computer aided design (CAD) content for users of a CAD application.

10. The computer-readable medium of claim 6, wherein the method further comprises, in response to an access violation error, reverting the database back to an operational state that existed prior to executing the database transaction.

11. A computer system for providing access control for a content management system, the computer system comprising:
   a client computer executing a client application;
   a database management system including an application stored procedure and a database and configured to:
      receive a request from a client application to execute an application stored procedure stored in a database management system, wherein the application stored procedure includes a database transaction involving a data object stored in the database management system and is configured to create a record specifying an identifier associated with the data object in an audit log, and wherein the audit log stores a different record for each object involved in one or more database transactions included in the application stored procedure;
      invoke the application stored procedure;
      invoke a security check procedure that is configured to perform an access control check based on the identifier specified in the record included in the audit log to determine whether the client application is authorized to access the data object;
      clean the audit log by removing each of the different records for each object involved in the one or more database transactions included in the application stored procedure; and
      return an access violation error to the client application when the client application is not authorized to access the data object; and
      display the access violation error on a graphical user interface (GUI), wherein the GUI comprises options in a single screen to: select a stored procedure to run, select a path to load additional stored procedures, and run a stored procedure to review the executed results.

* * * * *